(12) United States Patent
Liu et al.

(10) Patent No.: US 12,215,220 B2
(45) Date of Patent: Feb. 4, 2025

(54) 3-D PRINTED SEMI-CRYSTALLINE AND AMORPHOUS POLYMER ARTICLES

(71) Applicant: Arkema France, Colombes (FR)

(72) Inventors: David Shin-Ren Liu, Bala Cynwyd, PA (US); Mark A. Aubart, West Chester, PA (US); Sara Reynaud, King of Prussia, PA (US)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 16/629,973

(22) PCT Filed: Oct. 3, 2019

(86) PCT No.: PCT/US2019/054444
§ 371 (c)(1),
(2) Date: Jan. 10, 2020

(87) PCT Pub. No.: WO2020/072746
PCT Pub. Date: Apr. 9, 2020

(65) Prior Publication Data
US 2021/0269629 A1     Sep. 2, 2021

Related U.S. Application Data

(60) Provisional application No. 62/758,798, filed on Nov. 12, 2018, provisional application No. 62/741,069, filed on Oct. 4, 2018.

(51) Int. Cl.
*C08L 33/12* (2006.01)
*B29C 64/106* (2017.01)
(Continued)

(52) U.S. Cl.
CPC ............... *C08L 33/12* (2013.01); *B33Y 70/00* (2014.12); *C08L 71/02* (2013.01); *C08L 77/06* (2013.01)

(58) Field of Classification Search
None
See application file for complete search history.

(56) References Cited

U.S. PATENT DOCUMENTS

10,406,726 B2   9/2019 Sand
10,406,747 B2   9/2019 Saarikoski et al.
(Continued)

FOREIGN PATENT DOCUMENTS

CN   102712798 A   10/2012
JP   2004277739 A   10/2004
(Continued)

OTHER PUBLICATIONS

Office Action issued on Sep. 29, 2021, by the Intellectual Property Office in corresponding Korean Patent Application No. 10-2021-7012823, and an English Translation of the Office Action. (11 pages).

(Continued)

*Primary Examiner* — Randy P Gulakowski
*Assistant Examiner* — Ha S Nguyen
(74) *Attorney, Agent, or Firm* — Boone IP Law

(57) ABSTRACT

The invention relates to 3D printed parts made with thermoplastic polymers having a low stiffening temperature. 3D printed parts of the invention have very good Z layer adhesion, have a high elongation at break in the Z direction, preferably of more than 50 percent, and have at least an 80 percent ratio of Z to XY stress at yield or at break. The resulting part may be nearly isotropic—having similar mechanical properties in the XY and Z print directions. The excellent layer adhesion makes the resultant printed part more robust—able to withstand many cycles of use. Certain polymers of the invention produce printed parts that have a very low haze, and are nearly transparent.

17 Claims, 3 Drawing Sheets

Zoomed in pictures of 3D printed plaques (~3 mm thick with 0.1mm layer heights) of sample 2, 4, and 5 respectively. Note the reduction of interlayer lines in sample 4 leading to reduced haze and increased transmittance.

(51) Int. Cl.
*B29C 64/118* (2017.01)
*B29C 64/314* (2017.01)
*B29C 64/329* (2017.01)
*B33Y 10/00* (2015.01)
*B33Y 70/00* (2020.01)
*B33Y 80/00* (2015.01)
*C08L 71/02* (2006.01)
*C08L 77/06* (2006.01)
*D01F 6/18* (2006.01)
*D01F 6/80* (2006.01)
*D01F 6/82* (2006.01)

(56) References Cited

U.S. PATENT DOCUMENTS

| | | | |
|---|---|---|---|
| 2004/0180980 A1 | 9/2004 | Petter et al. | |
| 2010/0234539 A1* | 9/2010 | Malet | C08G 69/40 525/436 |
| 2013/0052453 A1* | 2/2013 | Filou | B29C 64/153 428/327 |
| 2015/0145168 A1* | 5/2015 | Rodgers | B29C 64/118 264/308 |
| 2017/0361527 A1 | 12/2017 | Saarikoski et al. | |
| 2018/0203163 A1* | 7/2018 | Thakkar | G02B 1/14 |
| 2018/0237627 A1 | 8/2018 | Liu et al. | |
| 2020/0317867 A1 | 10/2020 | Hara et al. | |

FOREIGN PATENT DOCUMENTS

| | | |
|---|---|---|
| JP | 2016-221896 A | 12/2016 |
| JP | 2017535459 A | 11/2017 |
| JP | 2017222169 A | 12/2017 |
| JP | 2018118518 A | 8/2018 |
| KR | 10-2018-0019982 A | 2/2018 |
| WO | 2018/003379 A1 | 1/2018 |
| WO | WO 2018/075323 A1 | 4/2018 |
| WO | WO 2019/067857 A1 | 4/2019 |

OTHER PUBLICATIONS

Office Action (Notice of Rejection) issued on May 31, 2022, by the Japanese Patent Office in corresponding Japanese Patent Application No. 2021-518613, and an English Translation of the Office Action. (7 pages).

Office Action (The Second Office Action) issued on Jun. 1, 2022, by the China National Intellectual Property Administration in corresponding Chinese Patent Application No. 201980065148.4 (English Translation) (10 pages).

Office Action (The Decision of Final Rejection of the Application) issued on Sep. 2, 2022, by the China National Intellectual Property Administration in corresponding Chinese Patent Application No. 201980065148.4, English Translation of the Office Action only (6 pages).

* cited by examiner

Sample 2

Sample 4

Sample 5

Zoomed in pictures of 3D printed plaques (~3 mm thick with 0.1mm layer heights) of sample 2, 4, and 5 respectively. Note the reduction of interlayer lines in sample 4 leading to reduced haze and increased transmittance.

3-D PRINTED SEMI-CRYSTALLINE AND AMORPHOUS POLYMER ARTICLES

This application claims benefit, under U.S.C. § 119 or § 365 of PCT Application Number PCT/US2019/054444, filed Oct. 3, 2019; U.S. Provisional Application No. 62/741,069, filed Oct. 4, 2018; and U.S. provisional Application No. 62/758,798, filed Nov. 12, 2018, said applications incorporated herein by reference.

FIELD OF THE INVENTION

The invention relates to 3D printed parts made with thermoplastic polymers having a low stiffening temperature. 3D printed parts of the invention have very good Z layer adhesion, have a high elongation at break in the Z direction, preferably of more than 50 percent, and have at least an 80 percent ratio of Z to XY stress at yield or at break. The resulting part may be nearly isotropic—having similar mechanical properties in the XY and Z print directions. The excellent layer adhesion makes the resultant printed part more robust—able to withstand many cycles of use. Certain polymers of the invention produce printed parts that have a very low haze, and are nearly transparent.

BACKGROUND OF THE INVENTION

Equipment advances and reduction in pricing have allowed 3D printing to become widely adopted in homes, schools, and industry as a fast, simple, and often inexpensive way to prototype and make custom end-use parts. Specifically, material extrusion 3D printing (also known as fused filament fabrication or fused deposition modeling), has emerged as a process of choice for direct consumer use, larger scale production, and quick thermoplastic prototyping as it is the easiest to operate, produces the least waste, and provides the shortest turnaround time of conventional 3D printing technologies.

Many materials have been used to produce 3-D printed articles for a wide variety of end uses, from chocolate to collagen. Thermoplastic materials are especially well adapted for use with 3-D printers. Useful thermoplastic materials include polyamides and polyetheramide block copolymers, as described in PCT/US2018/53348. Polyamides exhibit an elongation at break of about up to 30 percent. Polyurethanes have an even higher elongation, but have poor chemical and weathering resistance In a preferred embodiment, the 3D printed materials have a level of elongation of greater than 50 percent in all directions and good layer adhesion in Z direction. The printed materials having good chemical, wear, and weathering resistance. Preferably the 3D printed materials would be elastomeric. Many elastomeric parts, or parts that wear, need good layer adhesion and robustness. Possible applications are shoes, athletic equipment, consumer products, industry parts, things that will go through hundreds or thousands of cycles.

Problem

A common problem in 3D printing is that the mechanical properties of the printed parts are much weaker than conventional injection molded parts. This problem has been attributed to the poor layer-to-layer adhesion obtained during deposition. The strength of the weld between layers is affected by a number of factors; such as inherent properties of the material (amorphous vs crystalline, rheological behavior, melting and crystallization points, viscosity and moduli values at the deposition, thermal conductivity of the material etc.); and processing conditions (temperature at the nozzle, feeding rates, cooling conditions at the exit of the nozzle etc.). Additionally, a problem with amorphous, and especially semi-crystalline parts made by a 3D printing process is that it is nearly impossible to produce an isotropic part. The parts are almost always stronger, and perform better in the printed (XY) direction, than in the direction perpendicular to the print direction (Z). As it applies to soft elastomeric materials, poor layer adhesion means poor elastomeric properties in the Z direction, and an introduction of asymmetry where the part performs much better in one direction than another as well as additional loss of elastomeric properties (like energy return) in the Z direction. In addition, poor layer adhesion also means potential tearing and failure along the layers for parts under compression or tension, especially those undergoing multiple cycles. This is a major issue hindering 3D printed parts for actual use, especially in athletic equipment, consumer products, and industrial applications. In contrast, an injection molded part will be isotropic and have no print direction effect and no layer weakness. There is a desire for a 3D printable material that is nearly isotropic, highly elastomeric (having a level of elongation at break of at least 50 percent), chemical resistant, wear resistant, fatigue resistant, and weather resistant.

Solution

It has now been found that semicrystalline and amorphous polymers having a select stiffening temperature at the print conditions exhibit very good mechanical properties in the Z direction. For example, most polyamide materials have poor material mobility when cooled down—stiffening quickly to produce poor interpenetrating layers, exhibiting poor layer adhesion and poor Z direction properties. In contrast, the materials of the invention all have higher material mobility (as measured by melt rheology) at layer interfaces during printing, resulting in greater polymer interpenetration across the layers and much higher layer adhesion. The materials of the invention all have high relative strength and high elongation at break in the Z direction, comparable to the XY direction. The materials of the invention produce parts capable of stretching past 50% in the Z direction, where typical materials and those outside the selected material stretch less than 50%. The selected materials of the invention have a G'/G" crossover temperature—also called the stiffening temperature—of less than 140° C., preferably less than 130 C, and preferably less than 125° C. at the print conditions.

This G'/G" value is related to the material rheology, which can be manipulated by adjusting the polymer, copolymer of block copolymer composition, the number average molecular weight of the material or of each block in a block copolymer, the ratio of the total soft to hard blocks in a block copolymer, and the amount, molecular weight and composition of each material in a polymer blend. Moreover, the use of material rheology and G'/G" crossover temperature allows for evaluation of both amorphous and semi-crystalline materials, as both amorphous and semi-crystalline materials exhibit a stiffening temperature.

The materials of this invention also exhibit significantly higher Z direction impact resistance and general part robustness. Due to the increased layer adhesion, the 3D printed parts of this invention can last longer in use and do not fail across the layer lines. Instead, the printed parts exhibit ductile failure similar to injection molded parts, versus brittle failure characteristic of typical 3D printed parts making these parts suited to actual use applications.

In addition to the stiffening (crossover) point, modulus G' values can also be used to identify a space of acceptability for good adhesion between layers. Dynamic mechanical analysis techniques and G' values are commonly used to determine wettability, peel strength, and adhesion properties of glues, slurries and adhesives. In this regards the melted filament can be treated as a soft matter, and the adhesion properties can be considered dependent on the G' values. The polymers have to be relatively flowable to make good contact with the underlying layer. In adhesives, this fact is captured in the Dahlquist Criterion which states that G' should be <0.1 MPa. Similarly, it is possible to define a critical modulus $G_c'$ for 3D materials. It should be possible to predict the quality of printability and weld strength by using such critical modulus value. So that a thermoplastic with a modulus lower than $G_c'$ is predicted to have a good adhesion, where a thermoplastic with modulus higher than $G_c'$ is expected to have poor layer-to-layer adhesion.

Additionally, the increased adhesion between the printed layers using the compositions of the invention yields very little visible interfacial layers, and thus greatly improved optics. Printed parts of the invention being of low haze and nearly transparent.

It is also possible to add fillers into the material to increase polymer thermal conductivity in order to achieve higher temperatures at the deposition line, which would potentially lead to a better weld strength. For instance, the addition of a metal oxide will increase thermal conductivity without increasing electrical conductivity. For example, the addition of aluminum oxide which is widely available, cheap and about 40 times more thermally conductive than glass. (Note: selection of fillers is much wider—do we need to list all the possibilities?). It would be also possible to add carbon based materials (carbon black, graphene, graphite, CNTs etc) to fabricate strong 3D printed conductive parts.

SUMMARY OF THE INVENTION

The invention relates to a 3D-printed article comprising a thermoplastic polymer, wherein said thermoplastic polymer is a semicrystalline or amorphous polymer, and has a cross-over temperature (G'/G") of less than 140° C., preferably less than 130° C., and more preferably less than 125° C., measured by parallel plate rheology. Preferably the article has a stiffening point of greater than 35° C., preferably greater than 55° C., and more preferably greater than 75° C., even more preferably greater than 95 C. While the printed article is a thermoplastic, the invention also contemplates articles that are thermoset materials due to known mechanisms, such as post-printing cross-linking using, for example radiation crosslinking, or the reactive printing of two distinct filaments that may react to form a thermoset material, or a single, segmented filament having two or more domains, which domains mix and react during the printing process.

In one embodiment the 3D printed article is a semicrystalline polymer such as a linear polyethylene, polytetrafluoroethylene, polyethylene terephthalate, isotactic polypropylene, polyamides, polyvinylidene fluoride, poly ether ether ketone, poly ether ketone ketone, polyphenylene sulfide, polyether block polyamides, polyester block polyamides, copolymaides, selected thermoplastic polyurethanes, soft polyolefins, and mixtures thereof.

In another embodiment, the 3D printed article is an amorphous polymer, such as ABS, polystyrene, polycarbonate, polysulfone, acrylics and polyetherimide. Especially useful acrylics include homopolymers and copolymers containing at least 51 weight percent, preferably at least 70 weight percent, and more preferably at least 80 weight percent of methyl methacrylate monomer units.

In another embodiment the semicrystalline polymer is a blend of two or more polymers.

In another embodiment the semicrystalline polymer is a polyamide block copolymer comprises polyamide and either polyether or polyester blocks. In a preferred embodiment, the polyether block comprises polytetramethylene glycol. In another embodiment the number average molecular weight of the polyether and/or polyamide block is less than 3,000, preferably less than 2,000 g/l.

In another embodiment the semicrystalline polymer is a polyamide block copolymer, wherein said semicrystalline block polymer has a melting point of less than 160° C., and preferably less than 155° C.

In another embodiment the semicrystalline polymer is polyamide block copolymer, wherein said semicrystalline block polymer has a crystallization temperature of less than 145° C., and preferably less than 135° C.

In another embodiment the semicrystalline polymer is wherein said semi-crystalline polymer has a viscosity at a shear of 1 $sec^{-1}$ of less than 100,000 Pa-sec, preferably less than 10,000, and more preferably from 50 to 1,000 Pa-sec at a temperature of 230° C., and a viscosity of 20 to 2,000 Pa-s, preferably from 25 to 1,000 Pa-s, and more preferably 30 to 500 Pa-s at a shear rate of 100 $sec^{-1}$ at a temperature of 230° C., as measured by a rotational viscometer according to ASTM C965.

In another embodiment the printed article is clear, or nearly clear, having a haze of less than 70% and a TWLT of greater than 75, as measured by ASTM D1003.

In one embodiment, the 3D-printed article has an elongation to break in the Z direction of at least 50%. Preferably the article has an elongation at break in the Z direction that is at least 80% of the XY stress at yield or break.

The 3D-printed article may further comprises from 1 to 50, preferably 1 to 40, more preferably 1-30, more preferably 1-20, and more preferably 2-10 weight percent of one or more additives.

In one embodiment, a filament for use in a 3D printing process, wherein said filament comprises at least one semicrystalline polymer, and wherein said filament has a cross-over temperature (G'/G") of less than 140° C., preferably less than 130° C., and more preferably less than 125° C.

Another embodiment of the invention is the process for printing a thermoplastic 3D article comprising the steps of:
presetting the software of a 3D printer to a set volume flow and line spacing for the printing of said article, and setting the nozzle and printing environment to provide an effective temperature;
feeding a thermoplastic polymer composition of embodiment one, in the form of filament, pellets or powder into the 3D printer, forming a semi-crystalline polymer melt, wherein the semicrystalline polymer is selected to have a cross-over temperature (G'/G") of less than 140° C., preferably less than 130° C., and more preferably less than 125° C., measured at the effective temperature;
feeding by the printer of the semicrystalline composition melt to a heated nozzle; and
depositing the semicrystalline composition melt at the set location, line spacing and flow rate set by the software, to form an article.

This process could involve a step of adding heat to the printed semicrystalline polymer from an external source external heat, which, for example, could be a heated chamber, a trailing hot air nozzle, or both.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

DETAILED DESCRIPTION OF THE INVENTION

Figure 1:
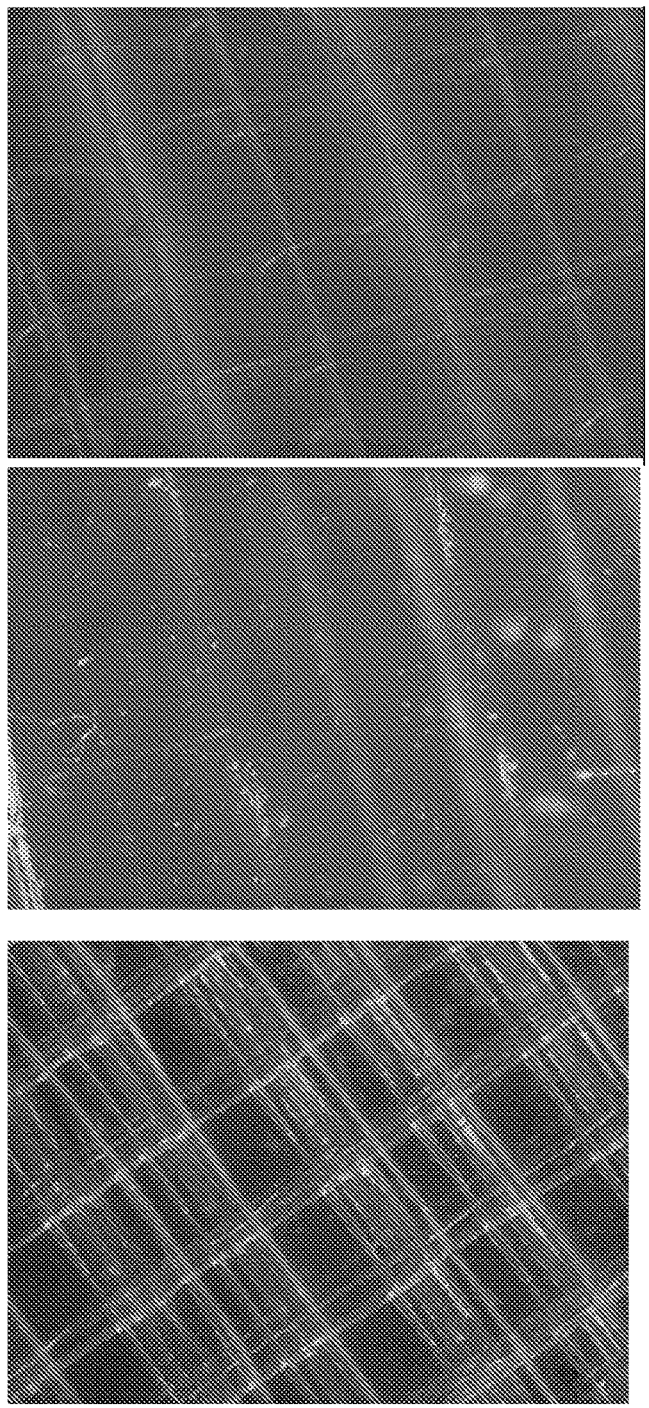
FIG. 1 shows zoomed in pictures of 3D printed plaques (~3 mm thick with 0.1 mm layer heights) of sample 2, 4, and 5 respectively.

The invention relates to a 3D printed article composed of thermoplastic polymers, in which the selected polymers have a stiffening temperature (G'/G") at print conditions, of less than 140° C., and preferably less than 130° C. These polymers may be semi-crystalline or amorphous. The polymers with the selected stiffening temperature range produce 3D printed articles having very good layer adhesion, resulting in good elastomeric properties such as energy return and cycle life. It is desired to have excellent elastomeric properties to be in all directions in a 3D article, and therefore layer adhesion, Z direction strength, and Z direction mechanical properties are important.

All references cited herein are incorporated by reference. Unless otherwise stated, all molecular weights are weight average molecular weights as determined by Gas Permeation Chromatography (GPC), and all percentages are percentage by weight.

The term "copolymer" as used herein indicates a polymer composed of two or more different monomer units, including two comonomers, terpolymers, and polymers having 3 or more different monomers. The copolymers may be random or block, may be heterogeneous or homogeneous, and may be synthesized by a batch, semi-batch or continuous process.

"Stiffening temperature", or "stiffening point" as used herein, refers to the rheological stiffening point, or rheological point of solidification, of the material at the print conditions. It is a measure of the mobility of the material at the effective temperature of printing. One measure of the stiffening point is the crossover temperature of G'/G" as measured by parallel plate rheology. Alternatively, where G' never crosses G" or crosses over multiple times, the stiffening temp can be defined as the temperature where G'>0.03 MPa. The stiffening temperature can be approximated by the crystallization temperature—though one of ordinary skill in the art understands that the crystallization temperature and solidification temperature do not occur at exactly the same point. In fact, the stiffening temperature is typically many degrees higher than the crystallization temperature as the stiffening temperature occurs at the onset of crystallization as the material begins to stiffen, whereas the crystallization temperature is at the peak of crystallization. Additionally, a composition that is a blend of different polymers, will exhibit multiple crystallization points, but only one rheological stiffening point. In addition, amorphous materials, or semi-crystalline materials that don't crystallize, will still exhibit a rheological stiffening point. For amorphous materials, the stiffening temperature will be associated with the Tg, glass transition temperature, but will occur at a higher temperature. Thus, the stiffening temperature can be used to characterize both amorphous and semi-crystalline materials. The crossover temperature can also be a function of the rate of cooling, with slow cooling providing a longer period of mobility, and a lower effective cross-over temperature. Slow cooling can result from printing an article without fan or in a heated chamber. A composition that would have a crossover/stiffening temperature too high to be part of the invention, may be manipulated to fall within the limits of the invention, by use of a slow cooling cycle.

The "effective stiffening temperature", as used herein refers to the stiffening temperature including the effect of external heating (or cooling). For example, if a heating chamber is used for the printing of the 3D article, the effective stiffening temperature of the material is the stiffening temperature as measured by rheology, minus any increase in temperature above ambient temperature due to the heating chamber.

The stiffening point of the invention describes the stiffening point of the polymer matrix, and does not account for physical property contributions of non-polymer additives, such as fillers.

"Semi-crystalline polymer" as used herein, refers to polymers having a degree of crystallinity of from 10 to 80 weight percent. The semi-crystalline polymers may have a variety of architectures, as long as there is at least eon crystalline segment, including but not limited to polymers, copolymers, block copolymers, comb copolymers, and star copolymers. A block copolymer having a semi-crystalline block and an amorphous block will be considered a semicrystaline polymer for this invention.

Examples of semi-crystalline polymers include, but are not limited to linear polyethylene, polytetrafluroethylene, polyethylene terephthalate, isotactic polypropylene, polyamides, polyvinylidene fluoride, poly ether ether ketone, poly ether ketone ketone, polyphenylene sulfide, polyether block polyamides, polyester block polyamides, copolymaides, selected thermoplastic polyurethanes, soft polyolefins such as Apolhya® resins from Arkema.

In one embodiment, blends of polymers are anticipated, where one or more polymers of the blend may have a stiffening temperature above 140° C., yet these high stiffening point polymers are blended with a sufficient amount of lower stiffening point materials, so the overall stiffening point of the whole composition is below 140° C. Such a blend will have the elastomeric, and mechanical properties of the materials of the invention, and may benefit from the mechanical properties provided by the higher stiffening point material(s).

In one embodiment, a useful blend is formed from at least one amorphous polymer with one or more semi-crystalline polymers.

"Effective temperature", as used herein means the temperature experienced by the 3D printed polymer as it is printing and cooling. The effective temperature will be effected by the nozzle temperature and the temperature of the printing environment—which could be ambient temperature, or could be at an elevated temperature in the case of a heated chamber. To first order approximation, one can define the effective temperature as the average of the nozzle temperature and the build chamber.

In one embodiment, the effective temperature could be altered by adding a layer heater to the 3-D printer. Instead of an entire heated chamber, to heat the sample and increase the mobility time of the printed polymer, hot air, radiant heat, microwave energy, or some other external energy source can be added directly to the polymer at the point of printing. A trailing hot air nozzle, for example, could be added to the printing nozzle, to add extra heat to the polymer—as printed. In another embodiment, the effective temperature can be altered by turning off the fan of the 3D printer, thus maintaining a higher air temperature right around the printed part and allowing for a higher stiffening temperature material to be used.

The invention relates to specific thermoplastic, semi-crystalline and amorphous polymers, having a low stiffening point of less than 140° C., preferably less than 130° C., and more preferably less than 125° C. For good printability, the stiffening point should be higher than 35° C., more preferably higher than 55° C., and more preferably higher than 75° C.

While the invention relates to any semi-crystalline or amorphous polymer having the requisite effective stiffening temperature, polyamide block polymers (PEBAs) are a preferred embodiment, and will be used to illustrate the invention. One of skill in the art can use the description of PEBA polymers, to practice the invention with other semi-crystalline polymers and blends of semi-crystalline polymers.

Polyamide block copolymers of the invention include polyetheramide block copolymers and polyesteramide block copolymers. The polyamide block copolymer alternately comprises "hard" or "rigid" blocks or segments (with a relatively thermoplastic behavior) and "soft" or "flexible" blocks or segments (with a relatively elastomeric behavior).

The invention will be describes below in terms of polyether block amides, but one in the art will recognize that similar descriptions apply for polyester block amides, and similar properties and processes would be contemplated for other semi-crystalline and amorphous polymers useful in the invention.

Polyether blocks and polyamide block copolymers, or PEBAs, result from the polycondensation of polyamide blocks comprising reactive ends with polyether blocks comprising reactive ends, such as, inter alia:

1) polyamide blocks comprising diamine chain ends with polyoxyalkylene blocks comprising dicarboxyl chain ends;
2) polyamide blocks comprising dicarboxyl chain ends with polyoxyalkylene blocks comprising diamine chain ends, which are obtained by cyanoethylation and hydrogenation of aliphatic α,ω-dihydroxylated polyoxyalkylene blocks, known as polyetherdiols;
3) polyamide blocks comprising dicarboxyl chain ends with polyetherdiols, the products obtained being, in this specific case, polyetheresteramides.

The polyamide blocks comprising dicarboxyl chain ends originate, for example, from the condensation of precursors of polyamides in the presence of a chain-limiting dicarboxylic acid. The polyamide blocks comprising diamine chain ends originate, for example, from the condensation of precursors of polyamides in the presence of a chain-limiting diamine.

The number-average molar mass Mn of the polyamide blocks can be controlled, and is generally between 400 and 20,000 g/mol, preferably between 500 and 10,000 g/mol, and more preferably less than 3,000 g/mol.

The polymers comprising polyamide blocks and polyether blocks can also comprise randomly distributed units.

Preferably, the polyetheramide block copolymer of the invention comprises from 1% to 80% by weight of polyether blocks and from 20% to 99% by weight of polyamide blocks, preferably from 4% to 60% by weight of polyether blocks and from 40% to 96% by weight of polyamide blocks and more preferably from 30% to 60% by weight of polyether blocks and from 40% to 70% by weight of polyamide blocks. The mass Mn of the polyether blocks is between 100 and 6,000 g/mol, preferably between 200 and 3,000 g/mol, and more preferably between 500 and 2,500.

The polyether blocks consist of alkylene oxide units. These units can, for example, be ethylene oxide units, propylene oxide units or tetrahydrofuran units (which results in the polytetramethylene glycol sequences). Use is thus made of PEG (polyethylene glycol) blocks, that is to say those consisting of ethylene oxide units, PPG (polypropylene glycol) blocks, that is to say those consisting of propylene oxide units, PO3G (polytrimethylene glycol) blocks, that is to say those consisting of polytrimethylene ether glycol units (such copolymers with polytrimethylene ether glycol units are described in the document U.S. Pat. No. 6,590,065), and PTMG blocks, that is to say those consisting of tetramethylene glycol units, also known as polytetrahydrofuran blocks. The PEBA copolymers can comprise several types of polyethers in their chain, it being possible for the copolyethers to be block or random copolyethers. The permeability to water vapor of the PEBA copolymer increases with the amount of polyether blocks and varies as a function of the nature of these blocks. It is preferable to use a polyethylene glycol polyether block which makes it possible to obtain a PEBA exhibiting good permeability.

The polyether blocks can also consist of ethoxylated primary amines. Soft polyether blocks can comprise polyoxyalkylene blocks comprising $NH_2$ chain ends, it being possible for such blocks to be obtained by cyanoacetylation of aliphatic α,ω-dihydroxylated polyoxyalkylene blocks, known as polyetherdiols. A preferred polyether block is PTMG preferred, as it is more hydrophobic, and therefore less moisture sensitive which is important for a filament for 3D printing.

The polyetherdiol blocks are either used as is and copolycondensed with polyamide blocks comprising carboxyl ends or they are aminated in order to be converted into polyetherdiamines and condensed with polyamide blocks comprising carboxyl ends. The general method for the two-stage preparation of PEBA copolymers having ester bonds between the PA blocks and the PE blocks is known and is described, for example, in the French patent FR 2 846 332. The general method for the preparation of the PEBA copolymers of the invention having amide bonds between the PA blocks and the PE blocks is known and described, for example, in the European patent EP 1 482 011. Polyether blocks may also be mixed with polyamide precursors and a chain-limiting diacid in order to prepare polymers comprising polyamide blocks and polyether blocks having randomly distributed units (one-stage process).

Advantageously, the PEBA copolymers have PA blocks of PA6, of PA11, of PA12, of PA6.12, of PA6.6/6, of PA10.10 and/or of PA6.14, preferably PA11 and/or PA12 blocks; and PE blocks of PTMG, of PPG and/or of PO3G. The PEBAs based on PE blocks consisting predominantly of PEG are to be ranked in the range of the hydrophilic PEBAs. The PEBAs based on PE blocks consisting predominantly of PTMG are to be ranked in the range of the hydrophobic PEBAs.

The polyamide block copolymers of the invention must have a semicrystalline nature, in order to obtain a 3D printed part. The polyamide must have at least some semi-crystalline properties. A pure amorphous polyamide block will not work in the invention, as the cross-over point is too high. A polyamide block that is itself a block copolymer having amorphous and semi-crystalline polyamide blocks would work in the invention.

Stiffening Temperature:

The polyamide block copolymers useful in the present invention are those having a stiffening temperature of less than 140° C., preferably less than 130° C. In general, the lower the stiffening temperature of the block copolymer, the more mobile the polymer matrix during the printing processing, the better the Z-layer adhesion. The stiffening temperature, or crossover temperature can be determined by measuring the modulus (MPa) and determine the temperature at which the G' plot crosses the G" plot. This can be seen in the Figures below. The stiffening temperature is similar to the crystallization temperature, but measured by rheology vs differential scanning calorimetry (DSC).

Generally speaking, the dynamic moduli are a measure of the viscoelastic properties of the material, being the storage modulus G', i.e. the elastic response, and the loss modulus G", i.e. the viscous response of the polymer. The crossover temperature (G'=G") can be taken as the onset of stiffening because the elastic modulus at lower temperature is dominating the viscous response. Alternatively, where there is no crossover temperature or more than one, the point where G'>0.03 MPa can be taken for the stiffening temp. A lower crossover/stiffening temperature can be understood as the material having a shorter relaxation time, suggesting a faster molecular interdiffusion, for a longer period of time as the material is cooling.

In one method used for measuring the stiffening temperature by rheological testing, first, the sample needs to be compression molded into a 25 mm diameter disc with a thickness in the range of 1.5 to 3 mm. It is preferable to heat the sample 15-20° C. above melt, and apply a pressure of 4 tons for 5-7 minutes before transferring to a cold press for 3-5 minutes.

The samples formed are then tested to determine the stiffening temperature using parallel plate rheometry. The test consists of melting the resin between parallel plates with a narrow gap, between 1.8 mm and 0.5 mm. In presence of fillers, the gap must be at least 10 times larger than the larger filler particle in the resin. It is preferable to heat the sample at least 30-50° C. above the melting temperature, but much before decomposition temperature. The rheometer used in this invention is the MCR502 from Anton Paar. The software is programmed to shear the sample by imposing a small oscillatory force while simultaneously decreasing the temperature at a constant cooling rates (between 5 C/min and 10 C/min are suggested). The test should be always run within the linear viscoelastic region which can be determined by running a strain amplitude sweep for each resin prior to the temperature sweep experiment.

The stiffening temperature is dependent on many factors, which can be adjusted as is known in the art, to provide the low stiffening temperature needed for good interlayer adhesion in a printed part. Some of these factors that can be manipulated in a PEBA are:

a) number average molecular weight, and especially the number average molecular weight of the soft block. As can be seen in comparing samples 2 and 3 below, having the same blocks at the same ratio, the higher number average molecular weight blocks resulted in a high Tm, and also higher stiffening temperature.

b) weight ratio of polyamide to polyether blocks.

c) composition of the polyamide blocks. As can be seen by comparing Sample 1 with sample 2 and sample 4, the shorter chain polyamides lower the stiffening temperature. Further, the composition of the polyamide block must be at least partially semi-crystalline, in order to obtain a 3D printed part.

d) viscosity: the viscosity of the polyamide block copolymer at the printing temperature (200-240° C.) at a high shear rate viscosity is 30 to 2000 Pa-s at 232° C. and 100 sec$^{-1}$, as measured by capillary rheometry.

For proper 3D printing, the composition of the invention should have a viscosity at a shear of 1 sec$^{-1}$ of less than 100,000 Pa-sec, preferably less than 10,000, and more preferably from 50 to 1,000 Pa-sec at a temperature of 230° C., and a viscosity of 20 to 2,000 Pa-s, preferably from 25 to 1,000 Pa-s, and more preferably 30 to 500 Pa-s at a shear rate of 100 sec$^{-1}$ at a temperature of 230° C., as measured by a rotational viscometer according to ASTM C965.

e) the effective temperature: as defined as the average of the nozzle temperature and the chamber temperature or temperature around the part if the fan is turned off. When the environmental conditions of printing (nozzle temperature and/or chamber temperature) are higher or the fan is turned off during printing, the stiffening temperature of the printed composition may be higher. The importance of the stiffening temperature relative to the effective temperature is that the invention desires a stiffening temperature lower than the effective temperature to have good Z direction properties, preferably 10 C lower, more preferably 20 C lower than the effective temperature. While the stiffening temperature can be determined for the filament itself (no effect of the nozzle and any heating temperature), the effective temperature seen by the material at the print point and at subsequent layers will be higher, and thus the relative effective temperature can be higher.

Melt temperature: Another way to differentiate a polyamide block copolymer that will work in the invention from one that is not part of the invention, is based on the melting point. The melting temperature is not quite the same as the crystallization temperature, but is a close approximation. The PEBA block copolymers of the invention have a melting temperature (Tm) of less than 160° C., and preferably less than 155° C.

Additives:

Fillers can be added to the polyamide block copolymer at an effective level of from 0.01 to 50 weight percent, preferably 0.1 to 40 and more preferably from 1 to 30 volume percent, and 1 to 20 volume percent, and 2-10 percent, based on the total volume of the polymer and filler.

In a preferred embodiment, no fillers that increase the stiffness of the printed part are used—as the polyamide block copolymer of the invention is generally used for its elastomeric properties, and additives that decrease the elastomeric properties would be used only at low levels, if at all.

Additives that have little effect on the elastomeric effect, such as UV absorbers, dyes and pigments can generally be used.

Other fillers that would be used only a low level—as they stiffen the article would include as non-limiting examples: carbon fiber, carbon powder, milled carbon fiber, carbon nanotubes, glass beads, glass fibers, nano-silica, Aramid fiber, PVDF fiber, polyarylether ketone fibers, $BaSO_4$, talc, $CaCO_3$, graphene, nano-fibers (generally having an average fiber length of from 100 to 150 nanometers), and hollow glass or ceramic spheres.

Process:

The polyamide block copolymer, or other polymers of the invention, are formed into a filament, pellets, generally by an extrusion process. The filament could be mono-phase, or multi-phase. The compositions or resins will be 3D printed in a material extrusion (fused deposition modeling, fused filament fabrication) style 3D printer with or without filaments (any size diameter, including 1.75 mm, 2.85 mm or other sizes) and with any sized nozzle at any speed that can use filament, pellets, powder or other forms of the polyamide block copolymers.

A general description of the printing process would involve the following steps: Feeding the semi-crystalline polymer filament, pellets or powder into the 3D printer. The computer controls of the printer will be set to provide a set volume flow of material, and to space the printed lines at a certain spacing. The machine will feed the polymer composition to a heated nozzle at the set speed, the printer moving the nozzle into the proper position for depositing the set amount of semi-crystalline polymer composition.

For the polyamide block polymers a direct gear extruder is preferred due to the softness of the material/filament The printer would generally have a heated bed of 50-150° C. (preferably above 90° C.).

Process parameters of the 3-D printer can be adjusted to minimize shrinkage and warpage, and to produce 3-D printed parts having optimum strength and elongation. The use of selected process parameters applies to any extrusion/melt 3D printer, and preferably to filament printing.

Hydrophobic polyamide block copolymers—such as those having a PTMG polyether block, are preferred due to their resistance to moisture gain. The filament should be dry for best extrusion In one embodiment, two or more nozzles, using two or more different compositions could be utilized to produce novel, larger, and less warping articles. One use would be to produce a less warping, rigid, better base adhering compatible or miscible material as the base, then printing the lesser adhering, higher shrinking desired material on top. A variant would be to use an acrylic base composition, or a polymer film followed by printing the polyamide block copolymer composition on top.

Properties:

The 3D printed article of the invention is relatively isotropic—having similar properties in the XY direction, as in the Z direction, due to good layer adhesion. This provides a near 100% energy return when compressed or distorted—far better than similar energy return from a typical thermoplastic polyurethane (TPU). In addition, the 3D printed article has great impact resistance even down to −30° C., and preferably down to −35° C., in both XY and Z direction.

Articles printed with the PEBA composition of the invention are weather resistant and chemical resistant. Due to the good layer adhesion, the printed articles are also very robust, and will not easily fall apart and can handle multiple compression and tension cycles.

In one embodiment, the printed PEBA composition has little haze, and is nearly transparent. In the Examples, compositions using polyamide 11, had especially high clarity. The clarity relates to the 3D printed samples show little or no layer lines.

Due to the good layer to layer adhesion, articles made with this composition are nearly transparent—showing little or no layer lines.

Uses:

Due to the unique energy return, elongation, chemical and weather resistant properties, useful articles that can be 3D printed with the composition include sports products and consumer products needing elastomeric materials, such as the soles of shoes, watch bands, bike grips and other parts where flexible and soft-touch is desired, as well as excellent durability and weather/chemical resistance.

EXAMPLES

Example 1

A selection of PEBAs with varying amounts of hard and soft blocks (invention and comparative), and polyamides (comparative) were used as filaments. Tensile bars of each material were printed in both the XY and the Z direction.

PA=polyamide block

PTMG=poly(tetramethylene glycol) block

Ratio is the weight ratio of the polyamide blocks to the polyether blocks.

Mn was measured by GPC.

G'/G" is the crossover temperature (stiffening temperature) in ° C. This is determined by oscillary rheometry at $2\pi$ rad/sec (low shear), from the print temperature to about 50° C.

IM yield strength is the yield strength of an injection molded part, as measured by tensile testing.

3D yield stress in the XY and in the Z direction was measured by on a tensile bar (Type 1, lengthwise reduced to 50%) printed in either the XY or in the Z direction following ASTM D638

The "PA12+PTMG" represents a polyether block amide, having polyether blocks and polyamide blocks of the size (as represented by number average molecular weight Mn). PA12/B.14+PTMG represents a polyether block amide copolymer having polyamide blocks that are themselves block copolymers of PA12 and PA14.

All 3D printed parts in the below examples were printed at 230° C. and at room temperature without a heated chamber. Note the Z direction improvement of sample 10 compared to sample 9 as a result of printing without fan. Note sample #11 is amorphous, has no melting or crystallization temperature but does have a stiffening temperature also follows the stiffening temperature trend.

TABLE 1

| Sample # | 1 | 2 | 3 | 4 | 5 | 6 | 7 | 8 | 9 | 10 | 11 |
|---|---|---|---|---|---|---|---|---|---|---|---|
| Chemistry | PA 6/12 + PTMG | PA 12 + PTMG | PA 12 + PTMG | PA 11 + PTMG | PA 12-b-14 + PTMG | PA 11 + PTMG (comp) | PA 11 + PTMG (comp) | PA 12 + PTMG (comp) | PA 12 + PTMG (with fan) | PA 12 + PTMG (no fan) | PA/B.12 + PTMG (comp) |

TABLE 1-continued

| Sample # | 1 | 2 | 3 | 4 | 5 | 6 | 7 | 8 | 9 | 10 | 11 |
|---|---|---|---|---|---|---|---|---|---|---|---|
| Ratio | 50/50 | 50/50 | 50/50 | 50/50 | 70/30 | 80/20 | 80/20 | 80/20 | 80/20 | 80/20 | 75/25 |
| Mn | 1300/ 1000 | 1000/ 1000 | 2000/ 2000 | 1000/ 1000 | | 3800/ 1000 | 2600/ 650 | 4000/ 1000 | 2600/ 650 | 2600/ 650 | |
| Tm (° C.) | 113 | 147 | 160 | 148 | 158 | 180 | 173 | 169 | 164 | 164 | Tg = 90 |
| G'/G" (° C.) | 78 | 113 | 133 | 127 | 126 | 159 | 148 | 141 | 133 | 133 | 163 |
| IM yield stress at break | 8 Mpa 700% | 9 MPa 450% | 9 MPa >500% | 8 MPA >50% | 10 MPa >500% | 19 MPa >50% | 19 MPa >50% | 19 MPa >350% | 19 MPa >350% | 19 MPa >350% | 24 MPa >250% |
| 3D XY yield stress % at break | 5 MPa 1000% | 8 MPa >650% | 8 MPa 1400% | 7.5 MPa >1350% | 12 MPa >1000% | 21 MPa 200% | 17 MPa 500% | 19 MPa >750% | 19 MPa 450% | 19 MPa 450% | 25 MPa 270% |
| 3D Z yield stress % at break | 3 MPa 500% | 8 MPa >350% | 8 MPa >50% | 7 MPa >400% | 12 MPa >250% | Cannot print | 9 MPa 20% | 22 MPa >40% | 16 MPa 40% | 21 MPa 230% | 19 MPa 6% |

As can be seen from the data, there are several ways to select a polyamide block copolymer to provide a lower G'/G" crossover temperature.

Example 2

The samples of Example 1 were measured for TWLT and Haze, using ASTM D1003. The results are shown below in Table 2:

TABLE 2

| Sample | TWLT | Haze |
|---|---|---|
| 2 | 72 | 93 |
| 4 | 78 | 69 |
| 5 | 75 | 93 |

FIG. 1 shows zoomed in pictures of 3D printed plaques (~3 mm thick with 0.1 mm layer heights) of sample 2, 4, and 5 respectively. Note the reduction of interlayer lines in sample 4 leading to reduced haze and increased transmittance.

Figure 2:
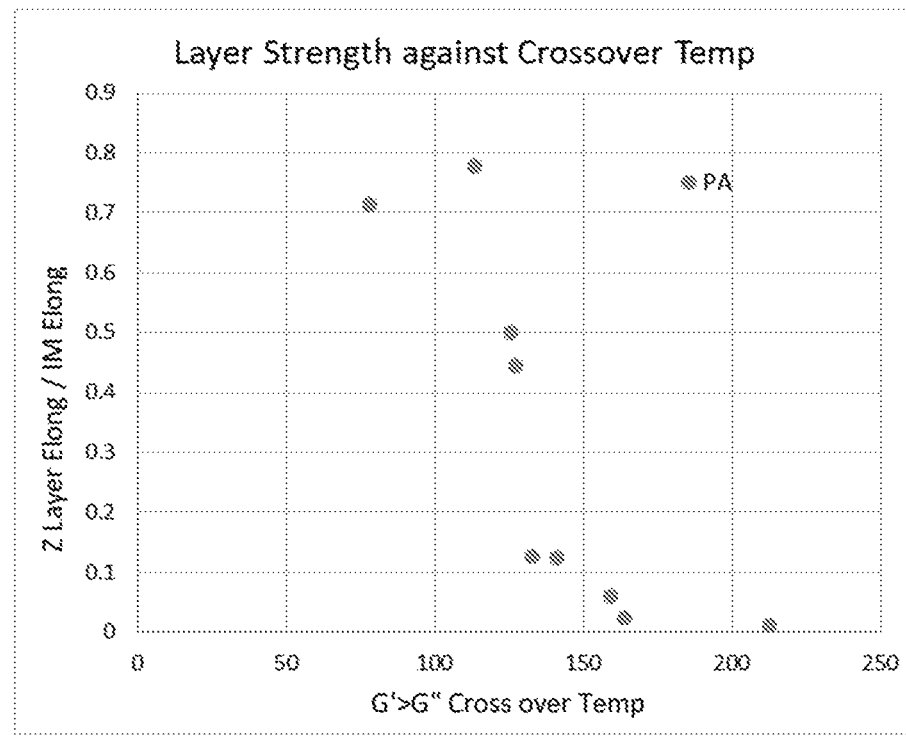
FIG. 2 is a plot showing layer strength (z layer elongation at break/injection molded elongation at break) against crossover temperature of various amorphous and semi-crystalline materials.

FIG. 2 is a plot showing layer strength (z layer elongation at break/injection molded elongation at break) against crossover temperature of various amorphous and semi-crystalline materials. Note the distinct effect of having crossover temperature less than 140, preferably 130, and more preferably less than 120 C.

Figure 3:
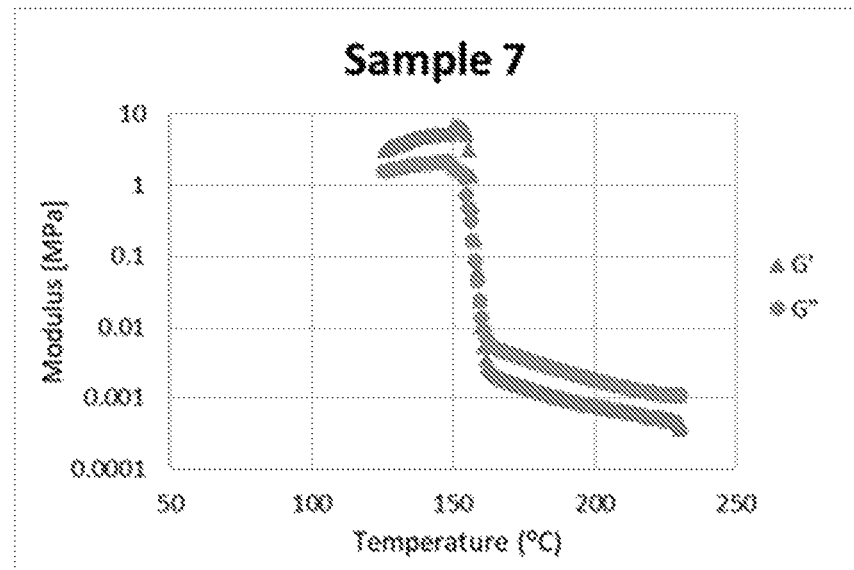
FIG. 3 shows a plot of the rheological curves, G' and G", of sample 7 as the temperature is reduced.

FIG. 3 shows a plot of the rheological curves, G' and G", of sample 7 as the temperature is reduced. Note the crossover temperature and stiffening temperature—148 C and the sharp increase in the G' modulus across that temperature. In this case the stiffening temperature is too high, and the part produced with this material has poor layer adhesion.

Figure 4:
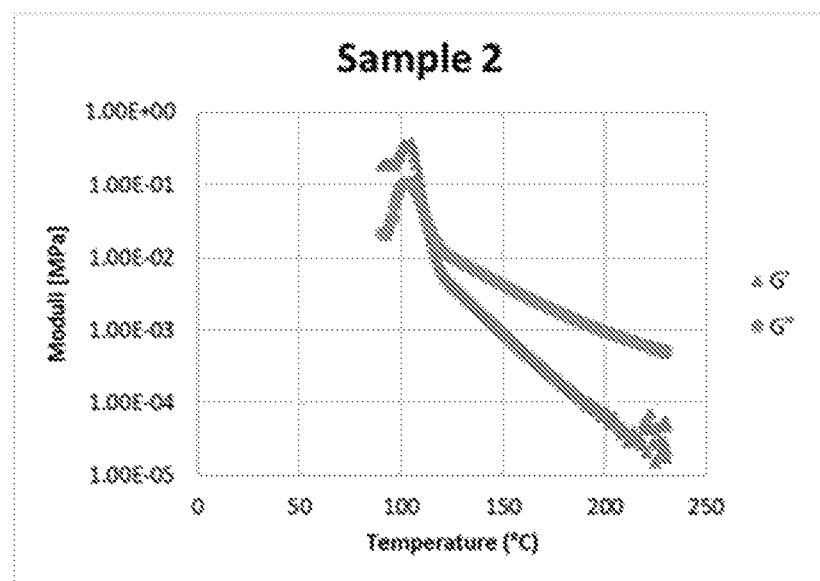
FIG. 4 plotting the rheological curves, G' and G", of sample 2 as the temperature is reduced.

FIG. 4 plotting the rheological curves, G' and G", of sample 2 as the temperature is reduced. Note the crossover temperature and stiffening temperature—113 C and the increase in the G' modulus across that temperature. In this case the stiffening temperature is in the invention, and the part produced with this material has great layer adhesion, with Z direction elongation at break of 350%.

What is claimed is:

1. A 3D-printed article formed from an extrusion 3-D printing process, the article comprising:
   one or more semicrystalline thermoplastic polymers, wherein said one or more semicrystalline thermoplastic polymers have a cross-over temperature (G'/G") of 78-133° C. as measured by parallel plate rheology and the extrusion 3-D printed article has an elongation to break in the Z direction of greater than 50%;
   wherein G' is the storage modulus of the one or more semicrystalline thermoplastic polymers, and
   wherein G" is the loss modulus of the one or more semicrystalline thermoplastic polymers,
   wherein the extrusion 3-D printing process includes extrusion printing the one or more semicrystalline thermoplastic polymers at an effective temperature that is higher than the cross-over temperature of the one or more semicrystalline thermoplastic polymers,
   said semi-crystalline thermoplastic polymers being a polyamide block copolymer comprising polyamide blocks and polyether blocks.

2. The 3D printed article of claim 1, wherein said polyether block comprises polytetramethylene glycol.

3. The 3D printed article of claim 1, wherein the number average molecular weight of the polyether and/or polyamide block is less than 3,000 g/mol.

4. The 3D-printed article of claim 1, wherein said semicrystalline block polymers have a melting point of less than 160° C.

5. The 3D-printed article of claim 1, wherein said semicrystalline block polymers have a crystallization temperature of less than 145° C.

6. The 3D-printed article of claim 1 wherein said one or more semicrystalline thermoplastic polymers have a viscosity at a shear of 1 sec$^{-1}$ of less than 100,000 Pa-sec at a temperature of 230° C., and a viscosity of 20 to 2,000 Pa-s at a shear rate of 100 sec$^{-1}$ of at a temperature of 230° C., as measured by a rotational viscometer according to ASTM C965.

7. The 3D-printed article of claim 1 wherein said article has a haze of less than 70% and a TWLT of greater than 75, as measured by ASTM D1003.

8. The 3D-printed article of claim 1 wherein said article has an effective stiffening point of greater than 35° C.

9. The 3D-printed article of claim 1 wherein said article has an elongation to break in the XY direction of at least 50%.

10. The 3D-printed article of claim 1 wherein said article has an elongation at break in the Z direction that is at least 80% of the article's XY stress at yield or break.

11. The 3D-printed article of claim 1 wherein said article further comprises from 1 to 50 weight percent of the at least additive.

12. The 3D-printed article of claim 1, wherein the one or more semicrystalline thermoplastic polymers are 3-D printing filaments that, optionally, comprise at least one additive, wherein said filaments have an elongation to break in the XY direction of at least 50%.

13. The 3D-printed article of claim 1, wherein said one or more semicrystalline thermoplastic polymers have a cross-over temperature (G'/G") of 78° C. to 130° C. measured by parallel plate rheology and an elongation to break in the XY direction of at least 50%.

14. The 3D-printed article of claim 1, wherein said one or more semicrystalline thermoplastic polymers have an elongation to break in the XY direction of at least 50%.

15. The 3-D printing article of claim 12, wherein said filaments have a cross-over temperature (G'/G") of 78° C. to 130° C., as measured by parallel plate rheology.

16. The 3D-printed article of claim 1, wherein the article comprises at least one additive selected from the group consisting of UV absorbers, dyes, pigments, carbon fibers, carbon powders, milled carbon fibers, carbon nanotubes, Aramid fibers, PVDF fibers, polyarylether ketone fibers, $BaSO_4$, $CaCO_3$, graphene, nano-fibers, ceramic spheres and combinations thereof.

17. The 3D-printed article of claim 12, wherein the filaments comprise the at least one additive, the at least one additive being selected from the group consisting of UV absorbers, dyes, pigments, carbon fibers, carbon powders, milled carbon fibers, carbon nanotubes, Aramid fibers, PVDF fibers, polyarylether ketone fibers, $BaSO_4$, $CaCO_3$, graphene, nano-fibers, ceramic spheres and combinations thereof.

* * * * *